(12) United States Patent
Hirrle et al.

(10) Patent No.: US 8,450,922 B2
(45) Date of Patent: May 28, 2013

(54) LUMINOPHORE AND LIGHTING SYSTEM HAVING SUCH A LUMINOPHORE

(75) Inventors: Renate Hirrle, Augsburg (DE); Guenter Huber, Schrobenhausen (DE); Frank Jermann, Koenigsbrunn (DE); Martin Zachau, Geltendorf (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 56 days.

(21) Appl. No.: 12/747,934

(22) PCT Filed: Nov. 17, 2008

(86) PCT No.: PCT/EP2008/065668
§ 371 (c)(1),
(2), (4) Date: Jun. 14, 2010

(87) PCT Pub. No.: WO2009/077278
PCT Pub. Date: Jun. 25, 2009

(65) Prior Publication Data
US 2010/0270909 A1 Oct. 28, 2010

(30) Foreign Application Priority Data
Dec. 14, 2007 (DE) .................... 10 2007 060 199

(51) Int. Cl.
*H01L 33/50* (2010.01)
*C09K 11/08* (2006.01)
*C09K 11/55* (2006.01)
*C09K 11/64* (2006.01)

(52) U.S. Cl.
USPC ..... 313/501; 313/484; 313/512; 252/301.4 R; 252/301.6 R

(58) Field of Classification Search
USPC .......... 313/500–512, 483–487; 252/301.4 R–301.4 H
See application file for complete search history.

(56) References Cited

U.S. PATENT DOCUMENTS

| | | | |
|---|---|---|---|
| 4,810,938 A | 3/1989 | Johnson et al. | |
| 6,466,135 B1* | 10/2002 | Srivastava et al. | 313/486 |
| 6,958,575 B2 | 10/2005 | Dombrowski et al. | |
| 7,755,276 B2* | 7/2010 | Wang et al. | 252/301.4 R |
| 7,872,825 B2 | 1/2011 | Sanghvi | |
| 8,242,528 B2 | 8/2012 | Berben et al. | |
| 2002/0190240 A1* | 12/2002 | Feldmann et al. | 252/301.4 R |
| 2005/0253114 A1 | 11/2005 | Setlur et al. | |
| 2005/0275333 A1 | 12/2005 | Liu et al. | |
| 2006/0027781 A1 | 2/2006 | Dong et al. | |
| 2006/0158090 A1* | 7/2006 | Wang et al. | 313/485 |
| 2012/0068592 A1* | 3/2012 | Srivastava et al. | 313/486 |

FOREIGN PATENT DOCUMENTS

| | | |
|---|---|---|
| EP | 0697453 A1 | 2/1996 |
| JP | 860147 A | 3/1996 |
| JP | 2003249694 A | 9/2003 |
| JP | 2010537357 A | 12/2010 |
| WO | 0210374 A2 | 2/2002 |
| WO | 03071610 A1 | 8/2003 |
| WO | 2006027786 A2 | 3/2006 |
| WO | 2006072919 A2 | 7/2006 |

(Continued)

OTHER PUBLICATIONS

Search Report of International application PCT/EP2008/065668, dated Apr. 15, 2009.

(Continued)

*Primary Examiner* — Mariceli Santiago

(57) ABSTRACT

A luminophore consisting of the BAM system as a host lattice, having the stoichiometry $M_x Eu_{1-x} Mg_{1-y+d} Mn_y Al_{10+2f} O_{17+d+3f}$ is provided, wherein $0.2 \leq x \leq 0.48$; $0 \leq y \leq 0.3$; $0 \leq d \leq 0.1$; $-0.1 \leq f \leq 1.0$.

9 Claims, 7 Drawing Sheets

FOREIGN PATENT DOCUMENTS

WO    2006076737 A2    7/2006
WO    2009077277 A1    6/2009

OTHER PUBLICATIONS

Liu et al., Luminiscent Centers of Eu2+ in BaMgAl_10_O_17 Phosphor, Materials Research Bulletin, 2001, vol. 36, No. 1/2, pp. 109-115.

Yamazaki et al., 2p-ZL-2 [Vortragsnummer], Temperature dependence of the excitation spectra of BaMgAl_10_O_17: Eu2+, Tokyo University of Technology, Extended abstracts (The 65th Autumn Meeting), The Japan Society of Applied Physicks, No. 3, 2004, pp. 1279.

English-language abstract of JP 8-60147 A; Mar. 5, 1996.

* cited by examiner

LUMINOPHORE AND LIGHTING SYSTEM HAVING SUCH A LUMINOPHORE

RELATED APPLICATIONS

The present application is a national stage entry according to 35 U.S.C. §371 of PCT application No.: PCT/EP2008/065668 filed on Nov. 17, 2008, which claims priority from German application No.: 10 2007 060 199.0 filed on Dec. 14, 2007.

TECHNICAL FIELD

Various embodiments are based on a luminophore, e.g. for use in light sources. Various embodiments relate to a highly efficient luminophore from the BAM class, which e.g. emits in the blue and/or blue-green range. Various embodiments furthermore relate to a light source produced therewith and to a lighting system having such a luminophore.

BACKGROUND

U.S. Pat. No. 7,077,978 describes a luminophore based on BAM, which is doped with Eu and Mn. This luminophore is intended for use in UV LEDs. A similar luminophore is known from WO 2006/072919. A BAM-based luminophore doped only with Eu is furthermore known from WO 2006/027786. The conventional doping for such a luminophore is a maximum $Eu^{2+}$ content of at most 50 mol. % with respect to Ba.

SUMMARY

Various embodiments provide an optimal luminophore for applications by excitation in the short-wavelength range. The peak wavelength of the excitation is in this case intended to be at most 420 nm.

The previously known BAM luminophores typically have the stoichiometry BaMgAl10O17:Eu. Here, Eu is a divalent activator which is conventionally added in a maximum concentration of at most 50% with respect to Ba, calculated as a molar percentage. Occasionally, Mn is also used as a coactivator in order to move the emission to longer wavelengths. The emission therefore lies in the blue or blue-green spectral range.

The production in particular of efficient white LEDs on the basis of UV LEDs requires efficient, thermally stable blue luminophores. This presupposes good absorption by the luminophores above all in the 340-420 nm range, in particular 380-410 for near-UV LEDs, and a high quantum efficiency. What is crucial for LEDs is the product of absorption and quantum efficiency. The luminophores must not saturate at high excitation intensities, such as occur particularly in high-power LEDs. Furthermore, they should exhibit the least possible thermal quenching of the luminescence as a result of the high temperatures of up to 200° C. occurring in high-power LEDs.

At present, SCAP:Eu (Sr,Ca chlorapatites) and BAM:Eu (BaMg aluminate) are predominantly used as blue emitting luminophores for this. With the conventionally used Eu concentrations of between 5 and 15% Eu, SCAP already exhibits very high absorption in the 380-410 nm spectral range. The quantum efficiency and thermal quenching behavior are no longer optimal with these Eu concentrations, however, and are inferior to the case of BAM:Eu. Furthermore, the short-wavelength narrowband emission by SCAP is not always advantageous when efficient white LEDs with high color rendering are intended to be produced. BAM:Eu is used with Eu concentrations <50% (typically rather <30%), but has the disadvantage compared with SCAP of inferior absorption in the 380-410 nm range.

Predominant substitution of the $Ba^{2+}$ ion by $Eu^{2+}$ in the BAM host lattice BaMgAl10O17 surprisingly gives a very efficient luminophore. In this case, it is important for the Ba content to be adjusted so that excessive energy migration between the $Eu^{2+}$ ions is prevented. Very highly suitable luminophores are obtained with Ba concentrations of between 35 and 45%, according to the formula $Ba_xEu_{1-x}MgAl_{10}O_{17}$ with x=0.35 to 0.45.

A typical example is Eu0.6Ba0.4MgAl10O17. Here, the 40% proportion of $Ba^{2+}$ effectively stops excessive energy migration and therefore thermal luminescence mixing. The new luminophore is suitable, for example, for "color on demand" LEDs or for white LEDs. It can be tailored for different color temperatures and applications with high efficiency and good color rendering.

The Eu aluminate luminophore according to the invention has extremely low thermal quenching. At 175° C., the efficiency is still more than 80% of the efficiency at 25° C. The powder tablet absorption of the compound Eu0.6Ba0.4MgAl10O17 is already more than 80% with excitation at 400 nm, and at 380 nm it is even more than 90% with luminophore particle sizes smaller than 12 μm. A highly suitable particle size is 0.5 to 10 μm. The term particle size is to be interpreted here as the d50 value, more accurately as the median of the volume-referenced particle size distribution measured by means of laser scattering, for example CILAS.

The quantum efficiency (QE) of the novel luminophore is typically 84%+/−5% with excitation at 400 nm. With even shorter-wavelength excitation, QE values of more than 90% can be achieved.

Another embodiment of the invention is a BAM luminophore which is additionally doped with Mn besides Eu. Mn occupies the lattice site of Mg. A luminophore according to the invention in this case has the stoichiometry $Ba_xEu_{1-x}Mg_zMn_{1-z}Al_{10}O_{17}$. Here, x lies in the range x=0.35 to 0.48. For the selection of z, z=0.65 to 0.995. Mn is however much more sensitive to saturation effects. The use of Mn is therefore restricted to applications with relatively low intensities.

The heavy europium doping can also be applied to BAM luminophores with a different stoichiometry and composition. In another embodiment, the BAM luminophore is described by the stoichiometry $Ba_xEu_{1-x}Mg_{1-n+d}Mn_nAl_{10+2f}O_{17+d+3f}$.

Here, $0.2 \leq x \leq 0.48$; preferably $0.35 \leq x \leq 0.45$;
$0 \leq n \leq 0.3$, preferably $0 \leq n \leq 0.2$;
$0 \leq d \leq 0.1$;
$-0.1 \leq f \leq 1.0$.

These are compounds which can be stoichiometrically described quite simply, these varieties being known for BAM. In principle, such host lattices are previously known for example from WO 2006/072919. In its most general form, the BAM host lattice therefore also includes stoichiometries for example of the type BaAl12O19, or BAL. Even more generally formulated it is possible to represent the multiplicity of stoichiometries for BAM such that it is a mixture of two aluminates, with a first aluminate being low in Ba, corresponding to the stoichiometry $0.82BaO \cdot 6Al_2O_3$, and with a second aluminate containing Mg and representing the BAM BaMgAl10O17 per se. Because the low-Ba aluminate and the actual BAM BaMgAl10O17 have the same crystal structure as beta-Al2O3, the two compounds form solid solutions with a beta-Al2O3 structure. A general aluminate stoichiometry according to the invention can therefore be described as $\{(1-a)*(0.82[Ba_xEu_{1-x}O]-*6[Al_2O_3])\}*a(Ba_xEu_{1-x}MgAl_{10}O_{17})$.

Here, a is in principle given by $0 \leq a \leq 1$. In particular, a is $\geq 0.2$. Preferably, a is at least 0.65, particularly preferably at least 0.8. The value of x lies at from at least 0.52 up to 0.8. Preferably, x=0.55 to 0.65.

For less stressful applications, Mn may also be codoped as a replacement for Mg according to the aluminate stoichiometry $\{(1-a)*(0.82[Ba_xEu_{1-x}O]*6[Al_2O_3])\}*a(Ba_xEu_{1-x}Mg_{1-z}Mn_zAl_{10}O_{17})$.

Here, z should in particular be less than 0.3 and preferably at most 0.15, particularly preferably at most 0.04.

In this presentation, Ba may furthermore be partially or fully substituted by Sr, or else partially by Ca.

In another embodiment, the high europium concentration may be applied to luminophores in which Ba is partially or fully replaced by Sr and/or Ca, and which are derived from the BAM per se. This luminophore is described by the stoichiometry $M_xEu_{1-x}Mg_{1-y+d}Mn_yAl_{10+2f}O_{17+d+3f}$ with M=(Ba, Sr,Ca), where M is preferably represented by $Ba_z(Ca,Sr)_{1-z}$ with $z \geq 0.7$.

In this case, $0.2 \leq x \leq 0.48$; preferably $0.35 \leq x \leq 0.45$; $0 \leq y \leq 0.3$, preferably $0 \leq y \leq 0.2$; $0 \leq d \leq 0.1$; $-0.1 \leq f \leq 1.0$.

Such an LP is suitable for use particularly in PDPs (plasma display panels). Mixtures of luminophores are often used for PDPs, for example according to the RGB principle. Particularly suitable in this case is a mixture of the novel BAM with Zn2SiO4:Mn or BaAl12O19:Mn for the green emitting component and with (Y,Gd)BO3:Eu or YOE, i.e. Y2O3:Eu for the red emitting luminophore component.

Such luminophores may be produced in principle as for known BAM luminophores. Halogen compounds, preferably fluorides and chlorides, have proven suitable as fluxing agents for this. Compounds containing lithium and boron may, however, also be used.

For production, the reactants Al2O3, BaCO3, SrCO3, MgO, Eu2O3, BaF2 are mixed in a tumble mixer or the like for several hours. The reaction temperature should be from 1500 to 1650° C. Forming gas with an H2 content of from 2 to 20% is then introduced. The luminophore is subsequently ground in a mill for about 5 to 30 min. The luminophore may then optionally also be washed with water or dilute acids.

The elements F, Cl, Li, Na, B, La, Ce, Nd, Sm, Pr, Gd, Yb, Lu can also be inserted to a small extent into this general host lattice. In this case, the lattice structure detectable by XRD should essentially remain unchanged. Specifically, the following modifications in particular may be carried out:

replacement of Al to a small extent by B;

substitution of 2M by M1+M3, where M1 is one or more of the monovalent metals Li and/or Na and M3 is one or more of the trivalent rare-earth metals from the group La, Ce, Nd, Sm, Pr, Gd, Yb, Lu;

incorporation of M1+H into the host lattice, where M1 is a monovalent metal as defined above and H is one or more halogens from the group F, Cl; preferably, the proportion is at most 1%.

incorporation of trivalent rare-earth metals M3+ZZ at interstitial lattice sites, where M3 is as defined above and ZZ is one or more of the elements from the group F, Cl, O; also mixtures thereof; the proportion of F and Cl is preferably at most 1%, and for O at most 5%.

incorporation of various metallic ions such as Si, which in large concentrations would quench the luminescence, to an extent such that the luminescence is not yet significantly reduced. This means trace proportions which are much less than 1 wt. %.

The luminophore according to the invention may preferably be used for light sources which emit in the UV range, in order to achieve conversion into the visible spectral range. The excitation is carried out best with a peak wavelength of from 300 to 420 nm, preferably from 340 to 410 nm, particularly preferably at from 380 to 410 nm. Low-pressure lamps, high-pressure discharge lamps, but also in particular LEDs according to the principle of a conversion LED are suitable as light sources. In this way, on the one hand, color emitting LEDs can be produced, in particular with the use of only a single luminophore of the aluminate type described above, in particular BAM. White emitting LEDs may however also be produced in particular, to which end at least one further luminophore will generally be used in addition, which either emits yellow (for a "BY" solution), or red and green emitting luminophores (for an "RGB" solution), as known per se.

For a BY solution, in particular a garnet such as YAG:Ce or a Sion is suitable. For an RGB solution, in particular green luminophores such as nitridosilicates and red luminophore such as nitrides are suitable.

The luminophore may however also be used in principle for other purposes, in particular lighting systems as discussed in WO 2006/072919, for example LCDs and PDPs.

In particular, mixtures of various embodiments of the novel luminophore may also be used for this purpose.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
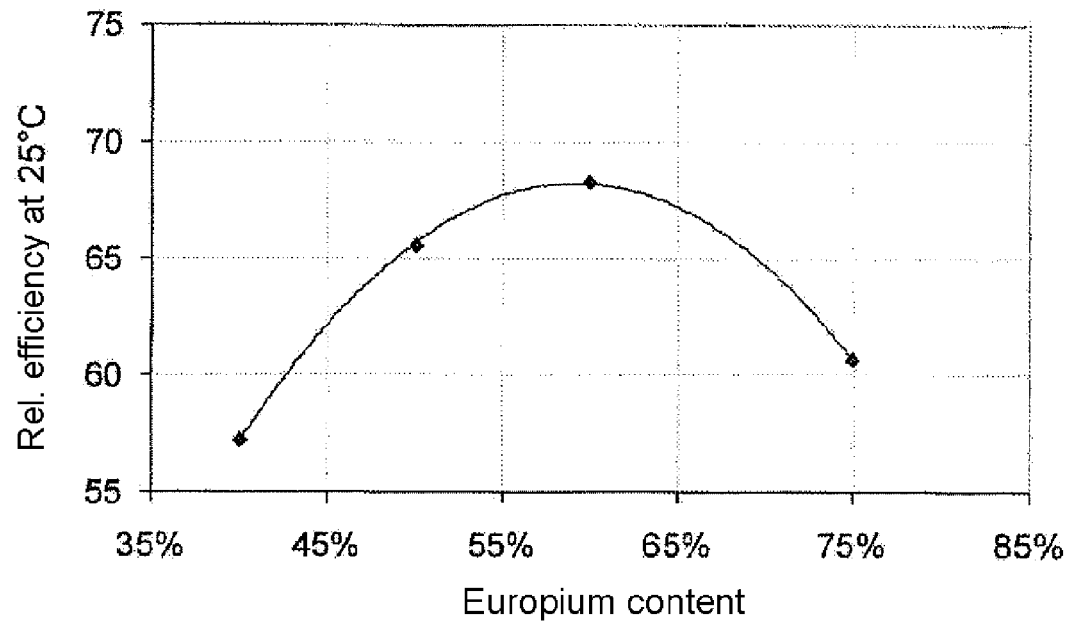
FIG. 1 shows the efficiency of a BAM luminophore at room temperature as a function of the Eu content.
Figure 2:
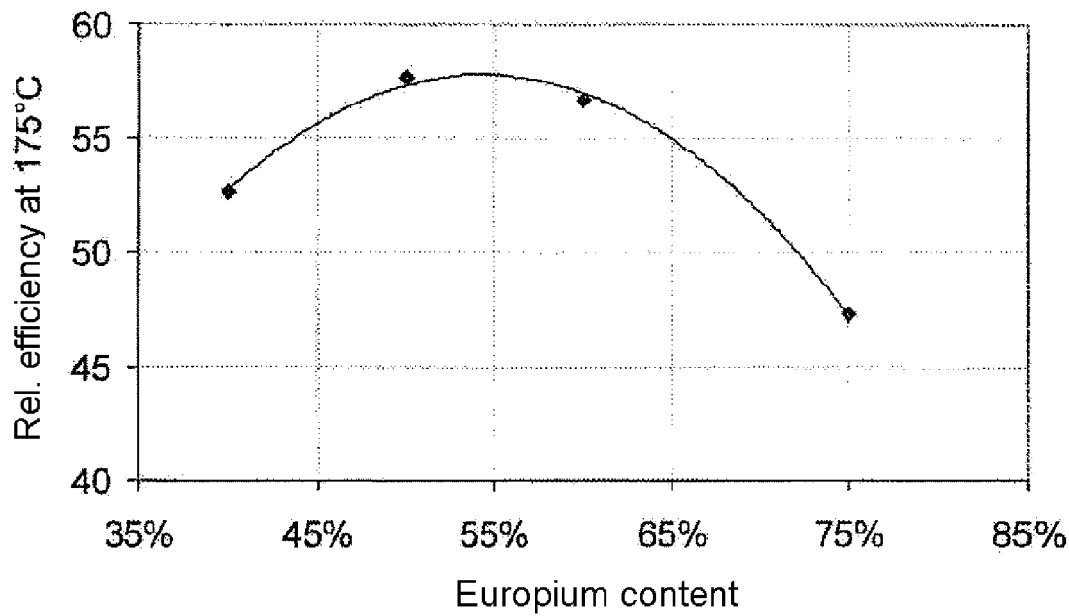
FIG. 2 shows the efficiency of the same BAM luminophore at 175° C. as a function of the Eu content.

FIG. 1 shows the relative efficiency of a BAM luminophore $Ba_xEu_{1-x}MgAl_{10}O_{17}$ as a function of the Eu content in mol. %, expressed in terms of M=(Ba,Eu). It has been found that the optimal Eu concentration at room temperature (25° C.) is about 60% Eu, corresponding to a value x=0.4.

The same measurement, relating to a temperature of 175° C., gives the result that the optimal Eu concentration is about 54%, corresponding to a value x=0.46.

Figure 3:
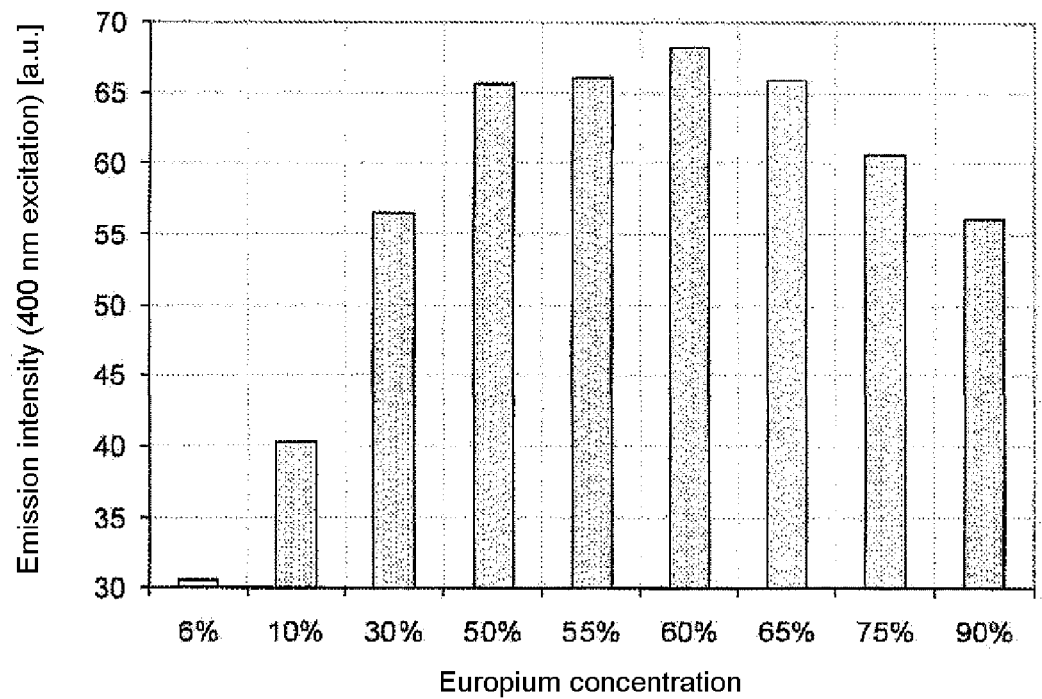
FIG. 3 shows the emission intensity of the same BAM luminophore with 400 nm excitation as a function of the Eu content.

FIG. 3 shows the emission intensity of this luminophore as a function of the Eu concentration with excitation at 400 nm. Surprisingly, the intensity does not reach its maximum until an Eu concentration of about 60%, which in turn corresponds to a value x=0.4.

Figure 4:
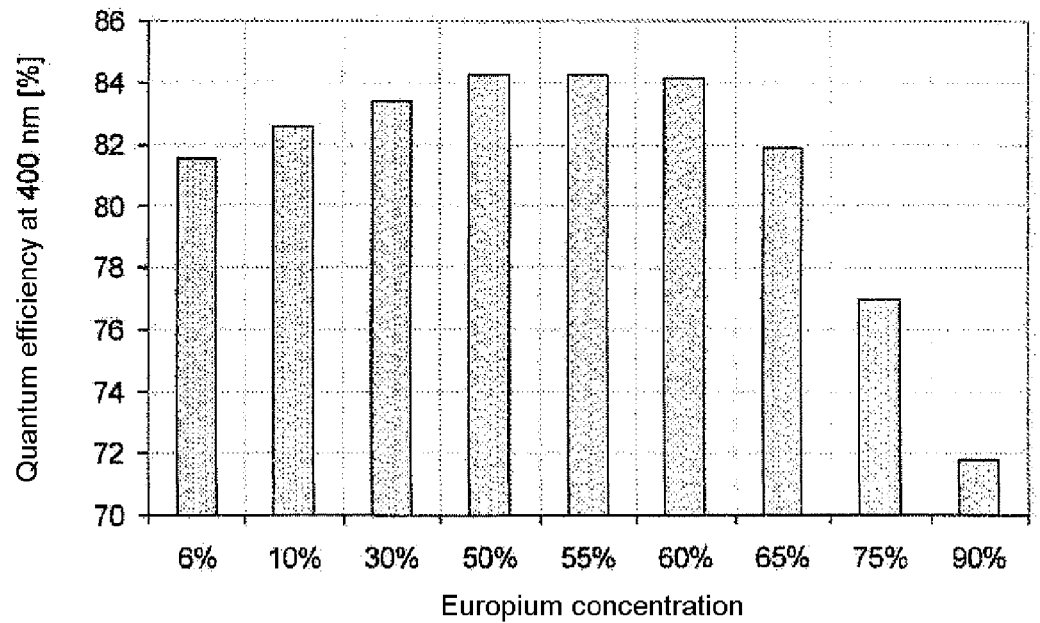
FIG. 4 shows the quantum efficiency of the same BAM luminophore as a function of the Eu content with 400 nm excitation.

FIG. 4 shows the quantum efficiency as a function of the Eu concentration. Surprisingly, with relatively long-wavelength excitation, here for example at 400 nm, the quantum efficiency initially increases with an increasing Eu content. An optimum is found with Eu values in the range of from 50 to 60%, i.e. x=0.4 to 0.5.

Figure 5:
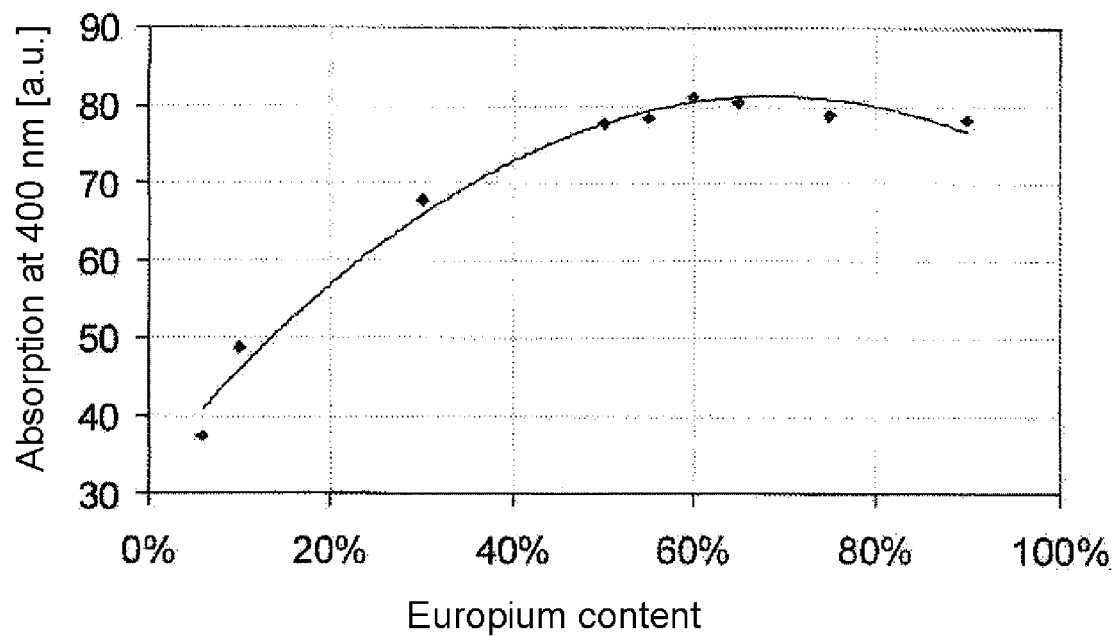
FIG. 5 shows the absorption of the same BAM luminophore with 400 nm excitation as a function of the Eu content.

FIG. 5 shows the absorption of this BAM luminophore, in relation to a powder tablet. It is found that the novel luminophore has much better absorption compared with previously conventional BAM:Eu luminophores.

Figure 6:
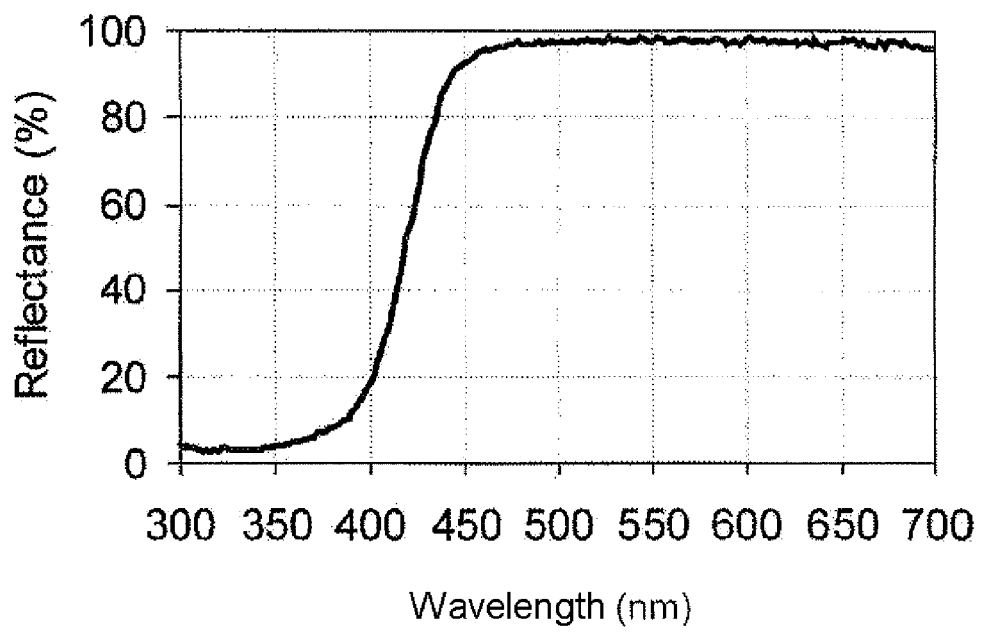
FIG. 6 shows the reflectance of a special BAM luminophore as a function of wavelength.

FIG. 6 shows the reflectance of the luminophore $Eu06Ba0.4MgAl10O17$ present in a powder tablet. It is found that this luminophore has a significantly improved reflectance compared with previous luminophores. This applies in particular for the absorption.

Figure 7:
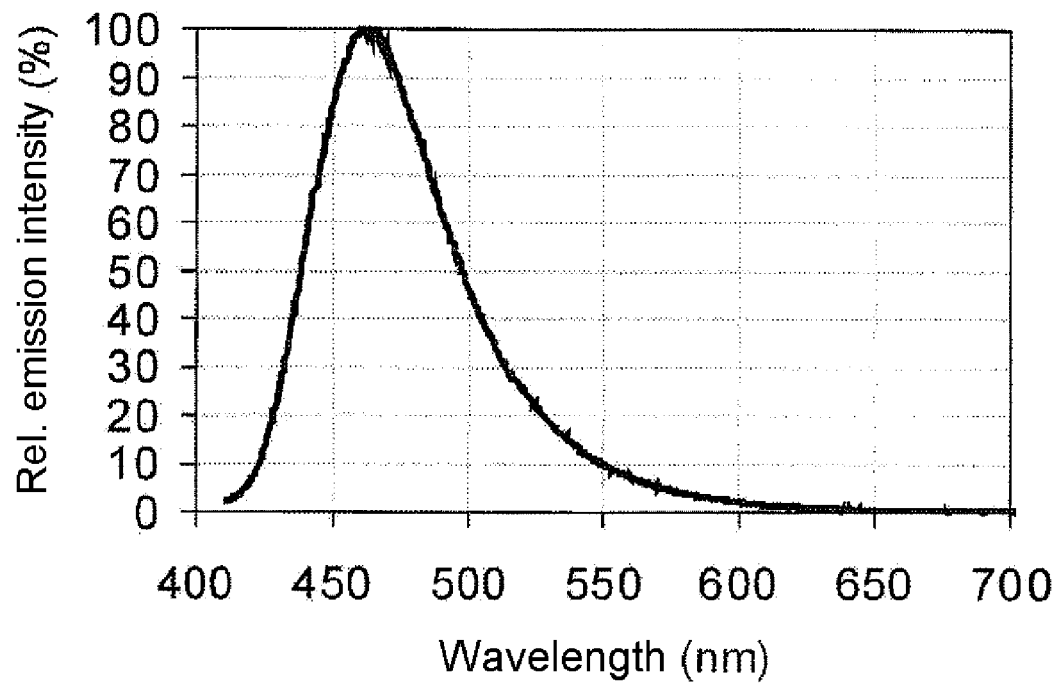
FIG. 7 shows the emission of the same luminophore as a function of wavelength.

FIG. 7 shows the emission of this specific luminophore as a function of wavelength. It is found that the emission behavior is very suitable for LEDs with high color rendering. The emission is at a relatively long wavelength and has a high blue-green component. Here again, the excitation was carried out at 400 nm.

Figure 8:
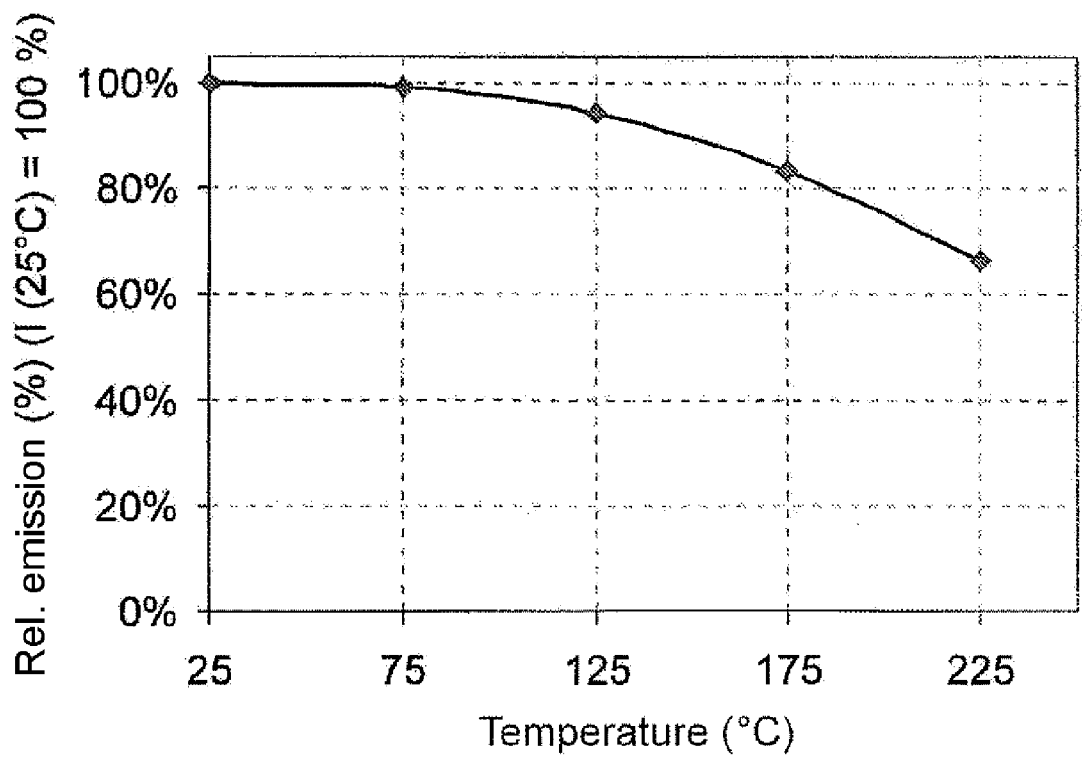
FIG. 8 shows the quenching behavior of the same luminophore as a function of temperature.

FIG. 8 shows the quenching behavior of this specific luminophore as a function of temperature. It is very stable, so that at 175° C. the efficiency is still more than 80% of the efficiency at 25° C. This makes the new luminophore especially attractive for thermally stressful environments, for example in an LED for vehicle headlamps.

Figure 9:
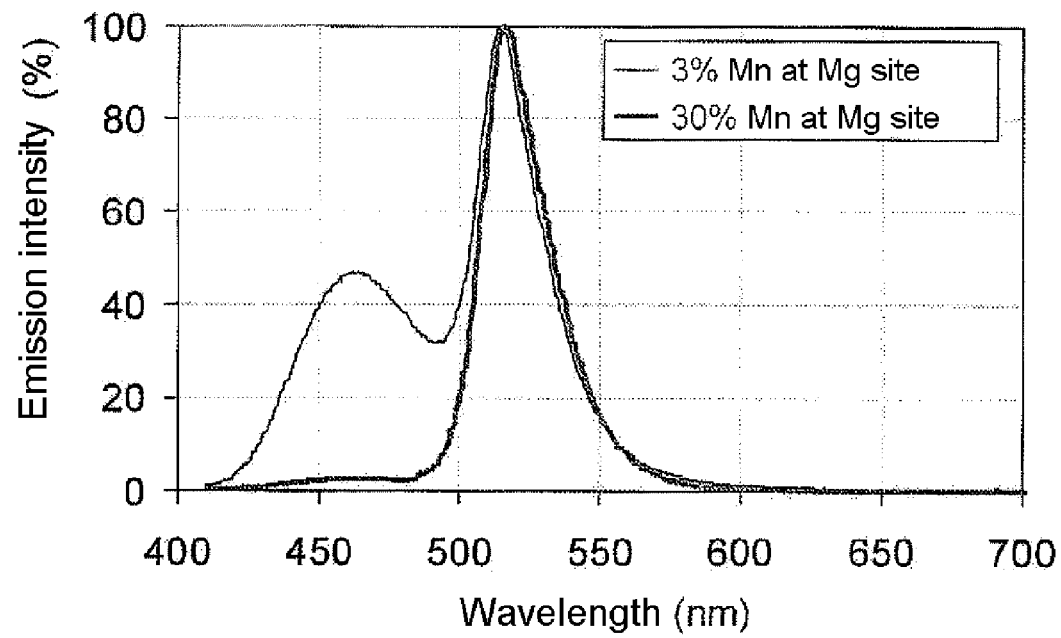
FIG. 9 shows the emission behavior of a modified BAM luminophore with the incorporation of Mn.

FIG. 9 shows the emission behavior of a luminophore having the stoichiometry $Ba0.4Eu0.6Mg1-yMnyAl10O17$. Incorporation of Mn at Mg lattice sites makes it possible to produce a highly efficient narrowband green luminophore, which is ideally suitable for example for LCD backlighting.

Figure 10:
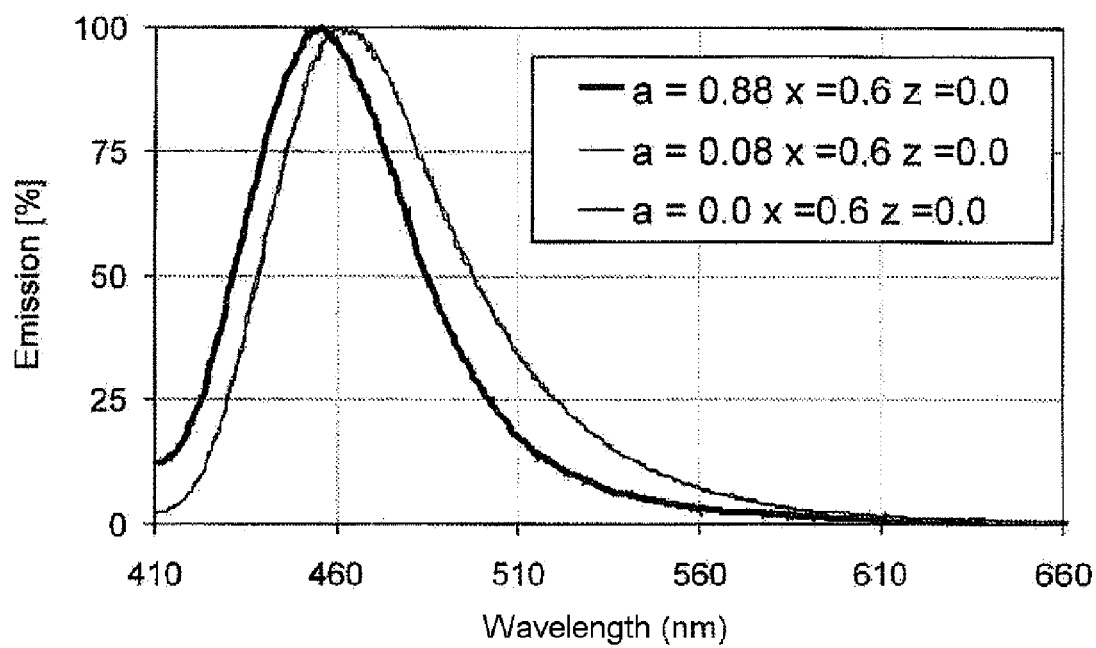
FIG. 10 shows the emission behavior of various luminophores with different stoichiometries.

FIG. 10 shows a comparison of the emission of various mixtures of a low-Ba aluminate phase and the BAM phase per se. The mixing parameter is a, as described above. With a low aluminate concentration, a=0.08, no significant changes are observed compared with the pure BAM phase, i.e. a=0. The two curves are almost superimposed. With a high aluminate concentration a, a short-wavelength shift of the emission is obtained. In the exemplary embodiment shown, a=0.88. The Eu concentration x, to be understood as a proportion relative to the metal $M=(Ba_{1-x}Eu_x)$, is in each case 60%. No Mn is used as codoping (z=0). This mixing effect can be used for optimal adjustment of the emission wavelength, or its peak, in an LED.

Figure 11:
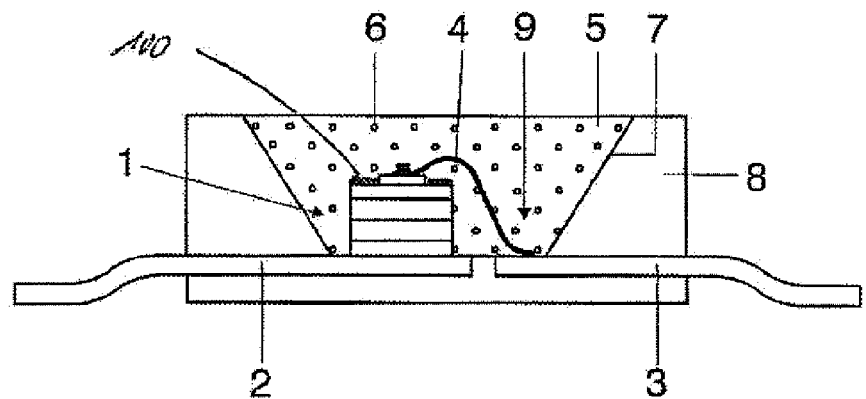
FIG. 11 shows the basic structure of a light source for blue-green light.

FIG. 11 shows the basic structure of a conversion LED, also referred to as a LUCOLED, having the luminophore according to the invention. The structure of a light source for blue-green light is shown explicitly in FIG. 11. The light source is a semiconductor component having a chip 1 of the InGaN type with a peak emission wavelength in the UV range, for example 405 nm, which is embedded in an opaque base package 8 in the region of an opening 9. The chip 1 is connected to a first terminal 3 via a bonding wire 4, and directly to a second electrical terminal 2. The opening 9 is filled with a potting compound 5, which contains as its main constituents a silicone resin (80 to 90 wt. %) and luminophore pigments 6 (typically less than 20 wt. %). The opening has a wall 7, which acts as a reflector for the primary and secondary radiation from the chip 1 and the pigments 6, respectively. The primary radiation of the UV LED is fully converted into blue-green radiation by the luminophore. The luminophore used is the BAM:(Eu,Mn) described above.

Similarly, a light source for white light can also be produced with such a luminophore, for example by using three luminophores which are excited to emit red, green and blue by the UV radiation source. The green luminophore is for example a Ba-Sion, the red one is for example $Ca5Al4Si8N18:Eu$ or a nitridosilicate $(Ca,Sr)2Si5N8:Eu$, and the blue one is an aluminate luminophore such as BAM:Eu with x=0.4. The blue luminophore of the BAM:Eu type is preferably applied directly on the surface of the chip in a layer 100 having a thickness of between 5 and 50 μm, preferably from 5 to 30 μm. This layer is, for example, applied electrophoretically. It can be kept so thin owing to the extremely high absorption of this luminophore, and it preferably contains at most 20 wt. % of other ingredients such as binders. The other luminophores, if further ones are used, are however further away, in particular distributed in the resin as represented, or applied as a second layer on the first layer 100.

Figure 12:
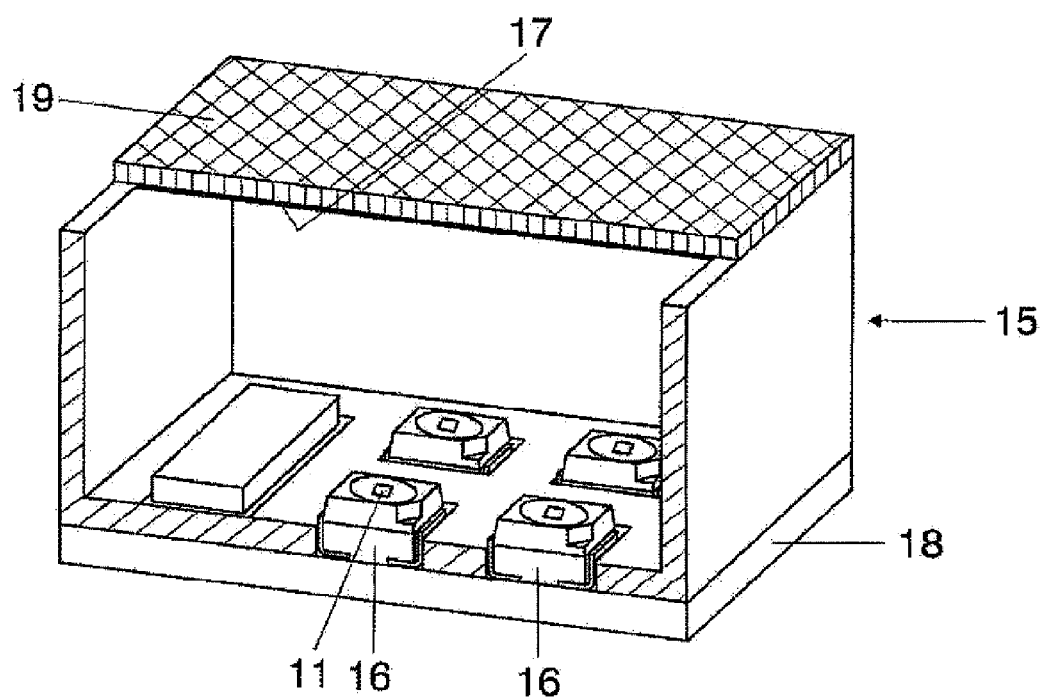
FIG. 12 shows the basic structure of a light source for white light.

The structure of another light source for white light is shown explicitly in FIG. 12. The light source is a semiconductor component 16 of the LED type having a UV emitting chip 11 of the InGaN type with a peak emission wavelength of for example 380 nm. The semiconductor component 16 is embedded in an opaque base package 18 with a sidewall 15 and a cover 19. The chip is the primary light source for two luminophores. The first luminophore 14 is BAM:Eu (60%), which partially converts the primary radiation of the chip 13 and transforms it into blue radiation with peak emission at 460 nm. The second luminophore is a yellow luminophore such as for example YAG:Ce, which partially converts the primary radiation of the chip 13 and transforms it into yellow radiation with peak emission at 560 nm.

In another exemplary embodiment, a UV LED (about 380 nm) is used as the primary light source for a white RGB luminescence conversion LED, in which case problems of aging and degradation of the package and resin or luminophore need to be avoided as substantially as possible by additional measures known per se, such as careful selection of the package material, addition of UV-resistant resin components. The great advantages of this solution are the low viewing angle dependency of the emission color and the high color stability.

Figure 13:
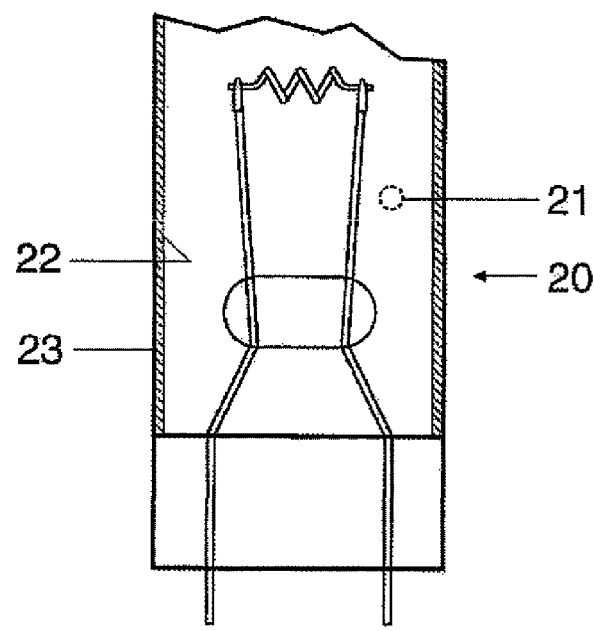
FIG. 13 shows the basic structure of a discharge lamp.

FIG. 13 shows a low-pressure discharge lamp 20 having a mercury-free gas fill 21 (schematized), which contains an indium compound and a buffer gas similarly as in WO 02/10374, one layer 22 consisting of BAM:Eu (60%). In general, so-called triple band luminophores are used in fluorescent lamps. To this end, a green luminophore and a red luminophore are added. Ba-Sion and red nitridosilicate $(Ba,Sr,Ca)2Si5N8:Eu$ are highly suitable.

This luminophore system is on the one hand adapted to the indium radiation, because it has substantial components in both the UV and blue spectral ranges, each of which is absorbed equally well. This mixture is, however, also suitable for conventional fluorescent lamps. It may also be used in an indium lamp based on high pressure, as is known per se from U.S. Pat. No. 4,810,938. In this case, the lamp has a conventional discharge vessel with a metal halide fill. The radiation strikes a luminophore layer on an outer bulb, which converts a part of the primary radiation into blue-green radiation components. The luminophore layer consists of BAM:Eu (60%). This technique is described in principle for example in U.S. Pat. No. 6,958,575.

An LED, in particular based on InGaN, or a discharge lamp, in particular based on mercury, or a lighting module, in particular based on an LED, is preferably suitable as a light source for a lighting system. The luminophore according to the invention may be applied directly on the light source, or separately placed before it.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A lighting system, comprising:
   a light source; and
   at least one luminophore placed in front of it for at least partial conversion of the light source's radiation into longer-wave radiation,
   wherein the light source is configured to emit primary radiation with a peak wavelength in the range of from 300 to 420 nm; and
   wherein a luminophore used for the conversion is a mixture of an aluminate of the BAM host lattice type and a low Ba-aluminate, the mixture having the stoichiometry $M_x Eu_{1-x} Mg_{1-y+d} Mn_y Al_{10+2f} O_{17+d+3f}$, wherein
   $0.2 \leq x \leq 0.48$;
   $0 \leq y \leq 0.3$;
   $0 \leq d \leq 0.1$;
   $0.1 \leq f \leq 1.0$;
   and wherein M is at least one of the group consisting of Ba, Sr and Ca.

2. The lighting system as claimed in claim 1, wherein the light source is an LED.

3. The lighting system as claimed in claim 1, wherein the light source is a discharge lamp.

4. The lighting system as claimed in claim 1, wherein the light source is a lighting module having an LED.

5. The lighting system as claimed in claim 1,
   wherein $035 \leq x \leq 0.45$;
   wherein $0 \leq y \leq 0.2$.

6. The lighting system as claimed in claim 2, wherein the light source is an LED based on InGaN.

7. The lighting system as claimed in claim 3, wherein the light source is a discharge lamp based on mercury.

8. The lighting system as claimed in claim 4, wherein the light source is a lighting module having an LED based on InGaN.

9. The lighting system as claimed in claim 1, wherein M is represented by $Ba_z(Ca,Sr)_{1-z}$ and wherein $z \geq 0.7$.

* * * * *

UNITED STATES PATENT AND TRADEMARK OFFICE
CERTIFICATE OF CORRECTION

PATENT NO. : 8,450,922 B2
APPLICATION NO. : 12/747934
DATED : May 28, 2013
INVENTOR(S) : Renate Hirrle et al.

It is certified that error appears in the above-identified patent and that said Letters Patent is hereby corrected as shown below:

IN THE CLAIMS:

Column 8, line 6, delete "$0.1 \leq f \leq 1.0$" and write "$-0.1 \leq f \leq 1.0$" in place thereof.

Signed and Sealed this
Twelfth Day of May, 2015

Michelle K. Lee
*Director of the United States Patent and Trademark Office*